(12) United States Patent
Li et al.

(10) Patent No.: US 10,310,757 B2
(45) Date of Patent: Jun. 4, 2019

(54) SYSTEMS AND METHODS FOR MEMORY POWER SAVING VIA KERNEL STEERING TO MEMORY BALLOONS

(71) Applicant: QUALCOMM INCORPORATED, San Diego, CA (US)

(72) Inventors: Yanru Li, San Diego, CA (US); Larry Bassel, La Jolla, CA (US); Thomas Zeng, San Diego, CA (US); Dexter Chun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 15/684,838

(22) Filed: Aug. 23, 2017

(65) Prior Publication Data

US 2019/0065087 A1 Feb. 28, 2019

(51) Int. Cl.
*G06F 3/06* (2006.01)

(52) U.S. Cl.
CPC .......... *G06F 3/0625* (2013.01); *G06F 3/0647* (2013.01); *G06F 3/0659* (2013.01); *G06F 3/0673* (2013.01)

(58) Field of Classification Search
CPC .... G06F 3/0625; G06F 3/0647; G06F 3/0659; G06F 3/0673; G06F 3/06
USPC ....................................................... 711/105
See application file for complete search history.

(56) References Cited

U.S. PATENT DOCUMENTS

| | | | |
|---|---|---|---|
| 8,285,936 B2 * | 10/2012 | Roberts | G06F 1/3203 711/118 |
| 9,384,096 B2 | 7/2016 | Hackborn et al. | |
| 9,639,287 B1 * | 5/2017 | Malina | G06F 17/40 |
| 9,933,955 B1 * | 4/2018 | Gosla | G06F 3/0656 |
| 2002/0186040 A1 | 12/2002 | Ooishi | H03K 3/012 326/1 |
| 2006/0129703 A1 * | 6/2006 | Oshikawa | G06F 1/3221 710/14 |
| 2008/0162970 A1 | 7/2008 | Yamaji | |
| 2008/0200220 A1 | 8/2008 | Jackson | |
| 2017/0123991 A1 * | 5/2017 | Sela | G06F 12/0246 |
| 2017/0286285 A1 * | 10/2017 | Berke | G06F 12/0804 |

FOREIGN PATENT DOCUMENTS

| | | |
|---|---|---|
| CN | 102129287 A | 7/2011 |
| CN | 101754356 B | 5/2015 |

* cited by examiner

*Primary Examiner* — Pierre Miche Bataille
(74) *Attorney, Agent, or Firm* — Smith Templel Blaha LLC/Qualcomm

(57) ABSTRACT

Systems, methods, and computer programs are disclosed for reducing memory power consumption. An exemplary method comprises configuring a power saving memory balloon associated with a volatile memory. Memory allocations are steered to the power saving memory balloon. In response to initiating a memory power saving mode, data is migrated from the power saving memory balloon. A power saving feature is executed on the power saving memory balloon while in the memory power saving mode.

30 Claims, 12 Drawing Sheets

| CONFIGURATION PARAMETERS 810 | |
|---|---|
| 811 | size of DDR to be enabled at power on |
| 812 | In order to keep a small DRAM to be powered on, allow kernel to kill the user apps at which level of "kill app" preference (0 – 9 the most preferred to be killed); set to 10 to indicate "do not kill apps as long as more memory to be powered on" |
| 813 | whether to allow killing apps to get rid of non-movable pages |
| 814 | how frequent memory monitor runs |
| 815 | allow balloon device for movable pages convert to accept non-movable pages |
| 816 | memory pressure low threshold |
| 817 | memory pressure high threshold |
| 818 | timeout since last memory power on/off operation (to prevent thrashing) |
| 819 | MAX % of memory to shrink in balloon |
| 820 | allow proactive migration |
| 821 | timeframe in day for aggressive power saving |
| 822 | weight for aggressive power saving (e.g., break even time 2.5 hours) |
| 823 | weight for moderate power saving (e.g., break even time 0.5 hours); to be done outside of aggressive power saving timeframe |
| 824 | overhead of shrinking per Kbyte |
| 825 | power saving for rank power down |
| 826 | power saving for PASR |
| 827 | power saving for PAAR |

*FIG. 8a*

| Banks | 0 | 1 | 2 | 3 | 4 | 5 | 6 | 7 | 0 | 1 | 2 | 3 | 4 | 5 | 6 | 7 | Shrink Size | Effort | MPS | Margin |
|---|---|---|---|---|---|---|---|---|---|---|---|---|---|---|---|---|---|---|---|---|
| Balloon ID | | | | 1 | 2 | 3 | 4 | 5 | 6 | 7 | 8 | 9 | 10 | 11 | 12 | | MByte | mA*S | mA*S | mA*S |
| Rank Off | X | X | X | X | 300 | 480 | 120 | 500 | 120 | 200 | 250 | 240 | 200 | 100 | 140 | 150 | 1400 | 630 | 1440 | 810 |
| 1/8 PASR | X | X | X | X | 300 | 480 | 120 | 500 | 120 | 200 | 250 | 240 | 200 | 100 | 140 | 150 | 1280 | 576 | 787.5 | 211.5 |
| ½ PASR | X | X | X | X | 300 | 480 | 120 | 500 | 120 | 200 | 250 | 240 | 200 | 100 | 140 | 150 | 1080 | 486 | 675 | 189 |
| ¾ PASR | X | X | X | X | 300 | 480 | 120 | 500 | 120 | 200 | 250 | 240 | 200 | 100 | 140 | 150 | 590 | 265.5 | 450 | 184.5 |
| PAAR | X | X | X | X | 300 | 480 | 120 | 500 | 120 | 200 | 250 | 240 | 200 | 100 | 140 | 150 | 340 | 153 | 1080 | 927 |

RANK 0 (4GB; 512KB PER BALLOON) — Banks 0–7 (left group)
RANK 1 (2GB; 256KB PER BALLOON) — Banks 0–7 (right group)

FIG. 11

SYSTEMS AND METHODS FOR MEMORY POWER SAVING VIA KERNEL STEERING TO MEMORY BALLOONS

DESCRIPTION OF THE RELATED ART

Portable computing devices (e.g., cellular telephones, smart phones, tablet computers, portable digital assistants (PDAs), portable game consoles, wearable devices, and other battery-powered devices) and other computing devices continue to offer an ever-expanding array of features and services, and provide users with unprecedented levels of access to information, resources, and communications. To keep pace with these service enhancements, such devices have become more powerful and more complex. Portable computing devices now commonly include a system on chip (SoC) comprising a plurality of memory clients embedded on a single substrate (e.g., one or more central processing units (CPUs), a graphics processing unit (GPU), digital signal processors (DSPs), etc.). The memory clients may read data from and store data in an external dynamic random access memory (DRAM) electrically coupled to the SoC via a high-speed bus, such as, a double data rate (DDR) bus.

As DDR capacity in consumer electronic devices continues to increase, memory power consumption continues to be a challenge. Existing DRAM technology provides various power saving features, such as, partial self refresh array (PASR) and deep power down (DPD). DDR memory usage is typically under the control of memory management provided by a high-level operating system (HLOS). The HLOS must be able to clear out data from the memory so that the DRAM regions (e.g., banks, ranks) can be powered down. The process for the HLOS to clear out data involves may subtasks, which creates a substantial energy overhead. For example, memory management is required to allocate new buffers to move to, perform page table management, data migration/copying, process killing, and swap data to storage. In conventional solutions, there is a lack of indication to the HLOS regarding when to get into memory power saving mode and how aggressively to reduce the memory allocation for each running application. Furthermore, existing solutions provide limited user configuration of memory power saving settings (e.g., blanket adjustment of settings to all applications without differentiation, blanket restriction on background applications).

Accordingly, there is a need for improved systems and methods for efficiently reducing DRAM power.

SUMMARY OF THE DISCLOSURE

Systems, methods, and computer programs are disclosed for reducing memory power consumption. An exemplary method comprises configuring a power saving memory balloon associated with a volatile memory. Memory allocations are steered to the power saving memory balloon. In response to initiating a memory power saving mode, data is migrated from the power saving memory balloon. A power saving feature is executed on the power saving memory balloon while in the memory power saving mode.

An embodiment of a system for reducing memory power consumption comprises a volatile random access memory and a system on chip (SoC). The SoC comprises a memory controller and a kernel memory manager. The memory controller is electrically coupled to the volatile random access memory. The kernel memory manager comprises logic configured to: configure a power saving memory balloon associated with the volatile memory; steer memory allocations to the power saving memory balloon; in response to initiating a memory power saving mode, migrate data from the power saving memory balloon; and execute a power saving feature on the power saving memory balloon while in the memory power saving mode.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 11 is a data structure illustrating an embodiment of an algorithm for estimating the effort needed for the logical power off of FIGS. 9 and 10.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone", "wireless communication device," and "wireless handset" are used interchangeably. With the advent of third generation ("3G"), fourth generation ("4G"), fifth generation ("5G") and other wireless technology, greater bandwidth availability has enabled more portable computing devices with a greater variety of wireless capabilities.

Figure 1:
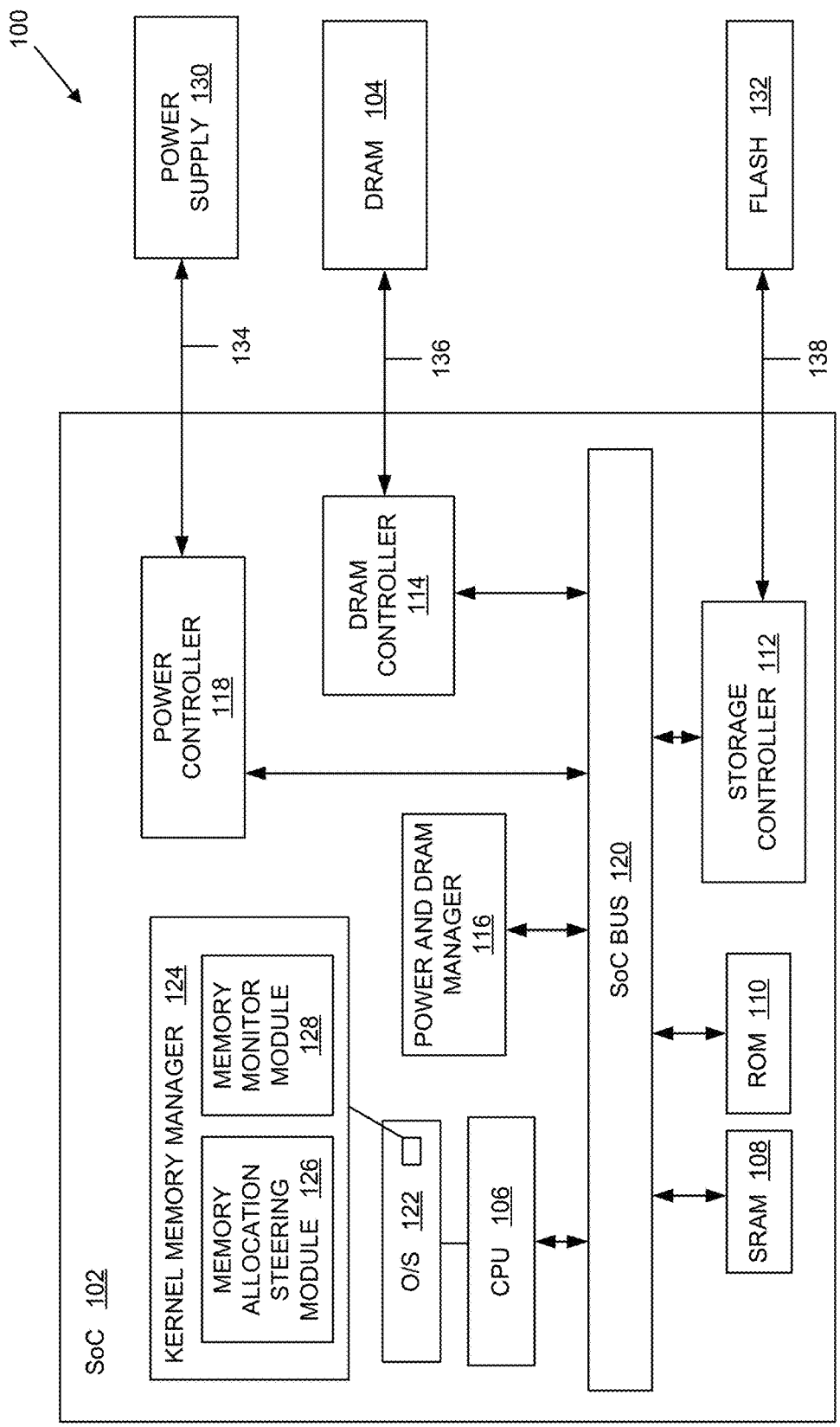
FIG. 1 is a block diagram of an embodiment of a system for memory power saving using kernel steering to memory balloon(s).

FIG. 1 illustrates an embodiment of a system 100 for memory power saving using kernel steering to one or more memory balloons. The system 100 comprises a system on chip (SoC) 102 electrically coupled to a volatile memory. In the embodiment of FIG. 1, the volatile memory comprises a dynamic random access memory (DRAM) 104 electrically coupled to the SoC 102 via a double data rate (DDR) interface 138. DRAM 104 may comprise one or more DRAM chips with each chip having a plurality of banks (e.g., 8 banks per DRAM chip). The system 100 provides an energy efficient method for controlling memory allocations to DRAM 104 from memory clients. The system 100 steers memory allocations to predetermined regions of the memory address space via memory ballooning. The data stored in one or more memory balloons (referred to as "power saving memory balloons") may be migrated away from the associated balloon in DRAM 104, and processes associated with the balloons may be killed. Then, the memory sections corresponding to the balloons may be powered down to save memory power.

It should be appreciated that system 100 may be implemented in any computing device, including a personal computer, a workstation, a server, a laptop computer, a gaming console, and a portable computing device (PCD), such as a cellular telephone, a smartphone, a portable digital assistant (PDA), a portable game console, a navigation device, a tablet computer, a fitness computer, and a wearable device (e.g., a sports watch, a fitness tracking device, etc.) or other battery-powered devices with a wireless connection or link.

As illustrated in FIG. 1, the SoC 102 comprises various on-chip components electrically coupled via SoC bus 120. The SoC 102 comprises one or more memory clients (e.g., central processing unit(s) (CPU) 106, graphics processing unit(s) (GPU), digital signal processor(s) (DSPs)), a static random access memory (SRAM) 108, read only memory (ROM) 110, a DRAM controller 114, a storage controller 112, a power controller 118, and DRAM power manager interconnected via SoC bus 120. The CPU 106 may support a high-level operating system (O/S) 122. As described below in more detail, the O/S 122 supports a kernel memory manager 124 configured to provide memory allocation steering (module 126) and memory monitoring (module 128).

The power controller 118 is electrically coupled to a power supply 130 via a power control bus 134. The storage controller 112 may be electrically coupled via a storage bus 138 to external non-volatile storage memory, such as, for example, flash memory 132 or other non-volatile memory device(s). Storage controller 112 controls communication with the external storage memory. The DRAM controller 114 controls communication with DRAM 104. The power and DDR manager 116 communicates with the power controller 118 and the DRAM controller 114 via SoC bus 120. The power and DDR manager 116 may comprise software running on CPU 106, or a separate hardware block or subsystem in SoC 102.

Figure 2:
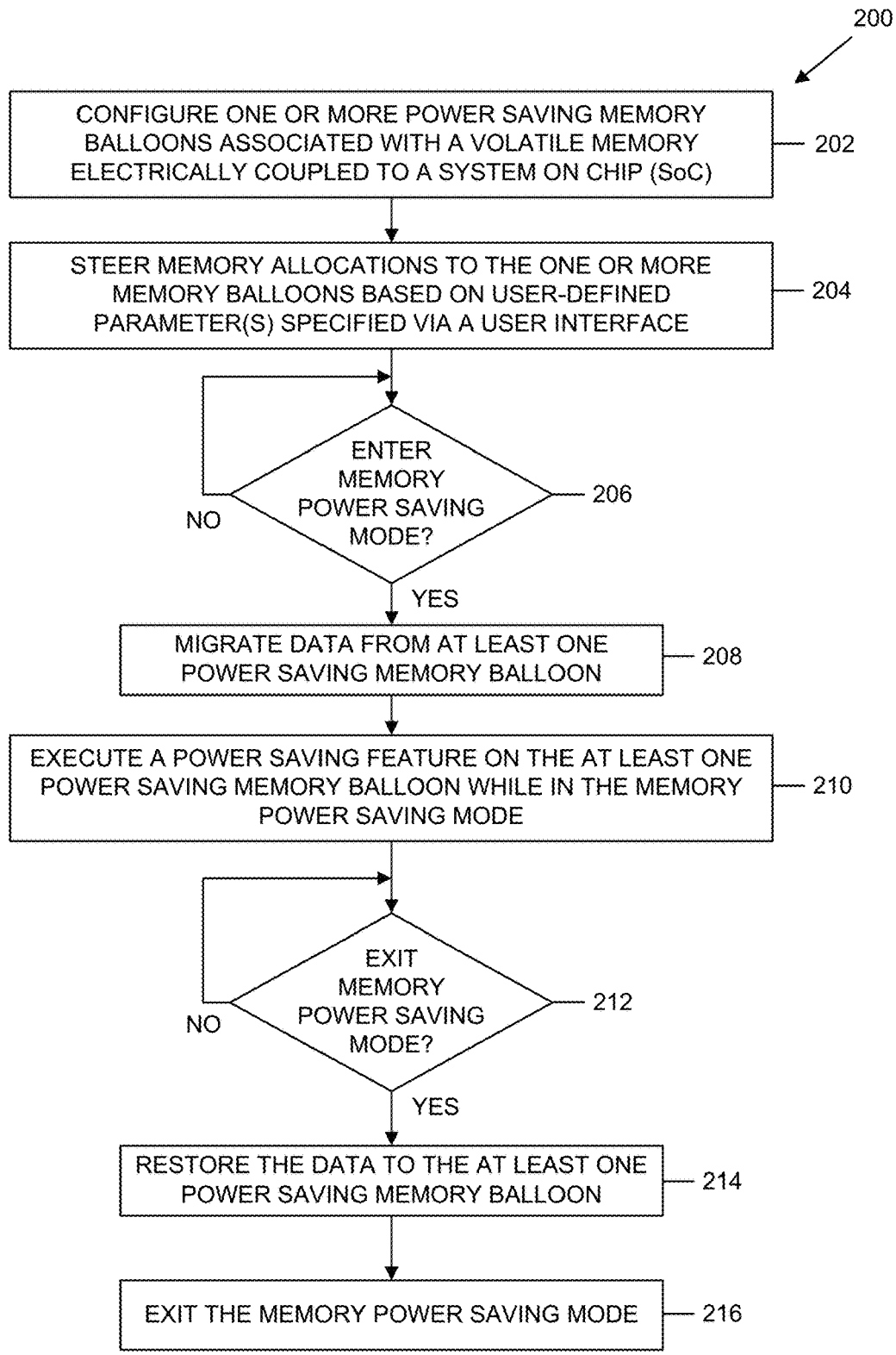
FIG. 2 is a flowchart illustrating an embodiment of a method for memory power saving using kernel steering to memory balloon(s).
Figure 3:
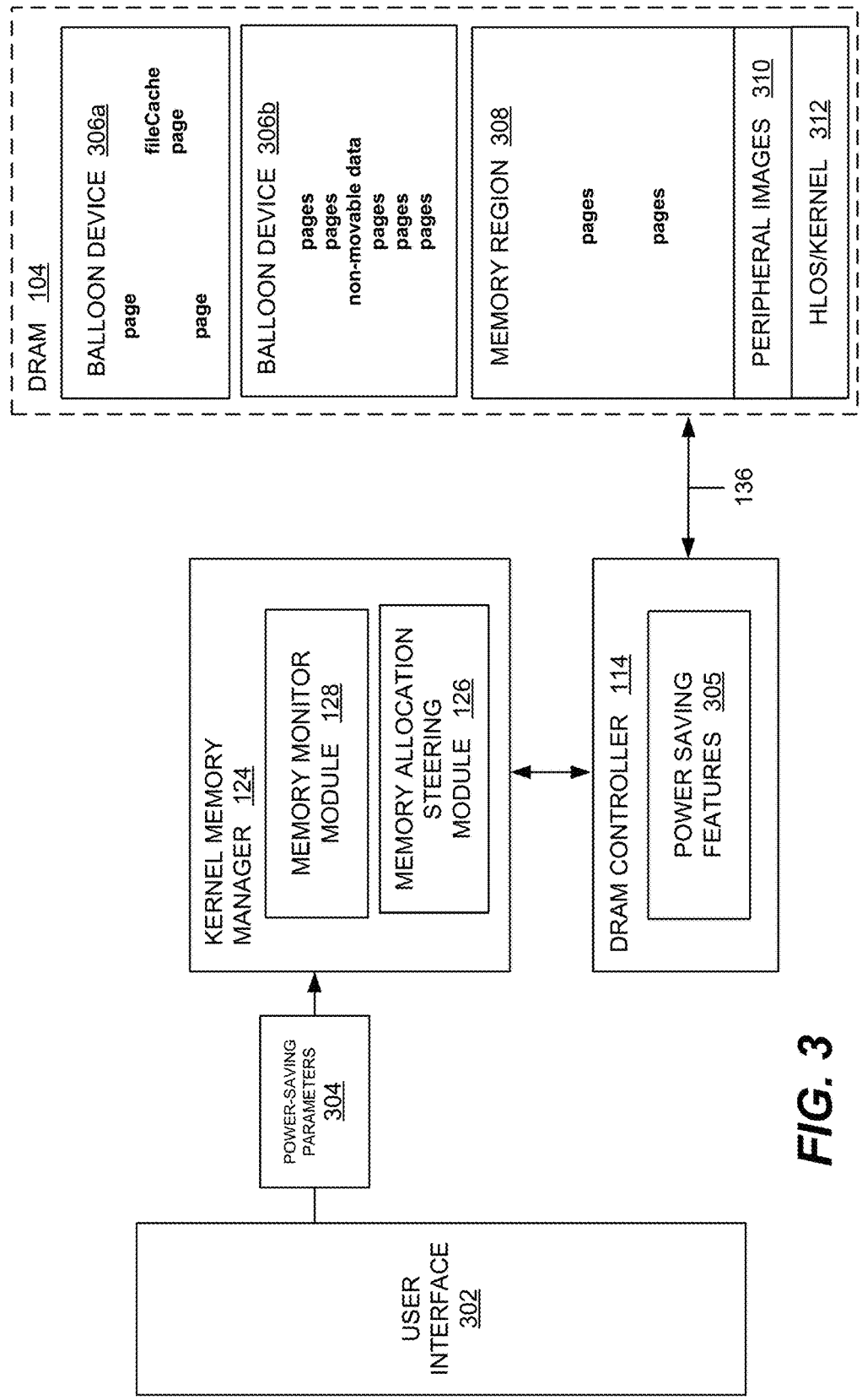
FIG. 3 is a block/flow diagram illustrating an embodiment of the memory monitor and memory allocation steering modules.

FIG. 2 illustrates an embodiment of a method 200 implemented in the system 100 for memory power saving using kernel steering to one or more memory balloon. At block 202, the system 100 configures one or more power saving memory balloons associated with DRAM 104. It should be appreciated that each memory balloon comprises a dedicated portion of the address range of DRAM 104 to which memory allocations may be steered by the memory allocation steering module 126. The memory balloon address range may be mapped to an organization of DRAM cells (e.g., bank, rank, or a group of rows), where a DRAM power saving feature may apply, features such as Partial Array Self-Refresh (PASR), Deep Power Down (DPD), rank power down, partial array auto-refresh, or any future power saving mode based on physical address range. A balloon driver is a driver running in the O/S kernel that is associated with a fixed large contiguous area of memory. Operations permitted to a balloon may include inflation (i.e., allocation of empty pages to the entire memory area of the balloon to clean up existing pages in the balloon) and deflation (i.e., freeing the empty pages from entire memory area of the balloon). There may be several balloons present in the system, with each balloon corresponding to a memory region in the DRAM 104 that is capable of power saving. FIG. 3 illustrates an exemplary embodiment in which the memory address range of DRAM 104 comprises a first balloon device 306a, a second balloon device 306b, and a memory region 308. Balloon device 306a comprises a first address range, and balloon device 306b comprises a second address range.

At block 204, the kernel memory manager 124 steers memory allocations associated with the system memory clients to the balloon devices 306a and 306b or the memory region 308. In an embodiment, the kernel memory manager 124 may steer memory allocation requests to movable and/or non-movable balloons based on corresponding movable and non-movable type indicators from the memory allocation request. As described below in more detail, the kernel memory manager 124 may steer non-contiguous allocations to/away from the balloon devices based on the memory monitor module 126, various policies, etc. In FIG. 3, balloon device 306a comprises various movable pages and a fileCache page. Balloon device 306b comprises movable pages and non-movable data. Memory region 308 may be allocated to, non-movable data, including, for example, peripheral images 310, HLOS/kernel data 312, etc. In response to initiating a memory power saving mode (decision block 206), the system 100 may determine which balloon to be powered off, and which data is to be migrated prior to executing a power saving feature to the corresponding memory balloon 306a and 306b.

It should be appreciated that the memory power saving mode may be initiated in various ways. In one example, the memory power saving mode may be triggered via user interface 302 (FIG. 3) (e.g., a user command, a user-specified condition, etc.). A user may manually trigger the memory power saving mode via a user interface component. In other embodiments, the memory power saving mode may be triggered based on a user-specified remaining battery threshold, a user-specified schedule, etc. Furthermore, it should be appreciated that the user interface 302 may be used to define various user preference(s) indicating one or more user-installed applications, priority schedule(s), etc. that may be suspended or terminated. The kernel memory manager 124 may access the user preferences and use this information to steer memory allocations, configure memory balloon(s), or otherwise assist the kernel in cleaning up memory from the physical DRAM locations to be powered down. For example, when evaluating energy needed to inflate a balloon (i.e., power down the memory range), the kernel may gather a list of user processes associated with active pages in the balloon physical address range. The kernel may check user preference(s) to decide whether to terminate a specific user application so that the pages associated with the user application can be freed. In this manner, the energy required to perform page migration upon entering power saving mode may be reduced. Furthermore, it should be appreciated that a system initialization process may provide the memory topology to the HLOS kernel (e.g., the number of banks, bank sizes, number of ranks, number of channels, interlevel configuration, the manner in which the HLOS physical address is mapped to the DRAM memory topology, etc.). Any of this information may be used to determine a number, size, and location of the memory balloons.

Figure 4:
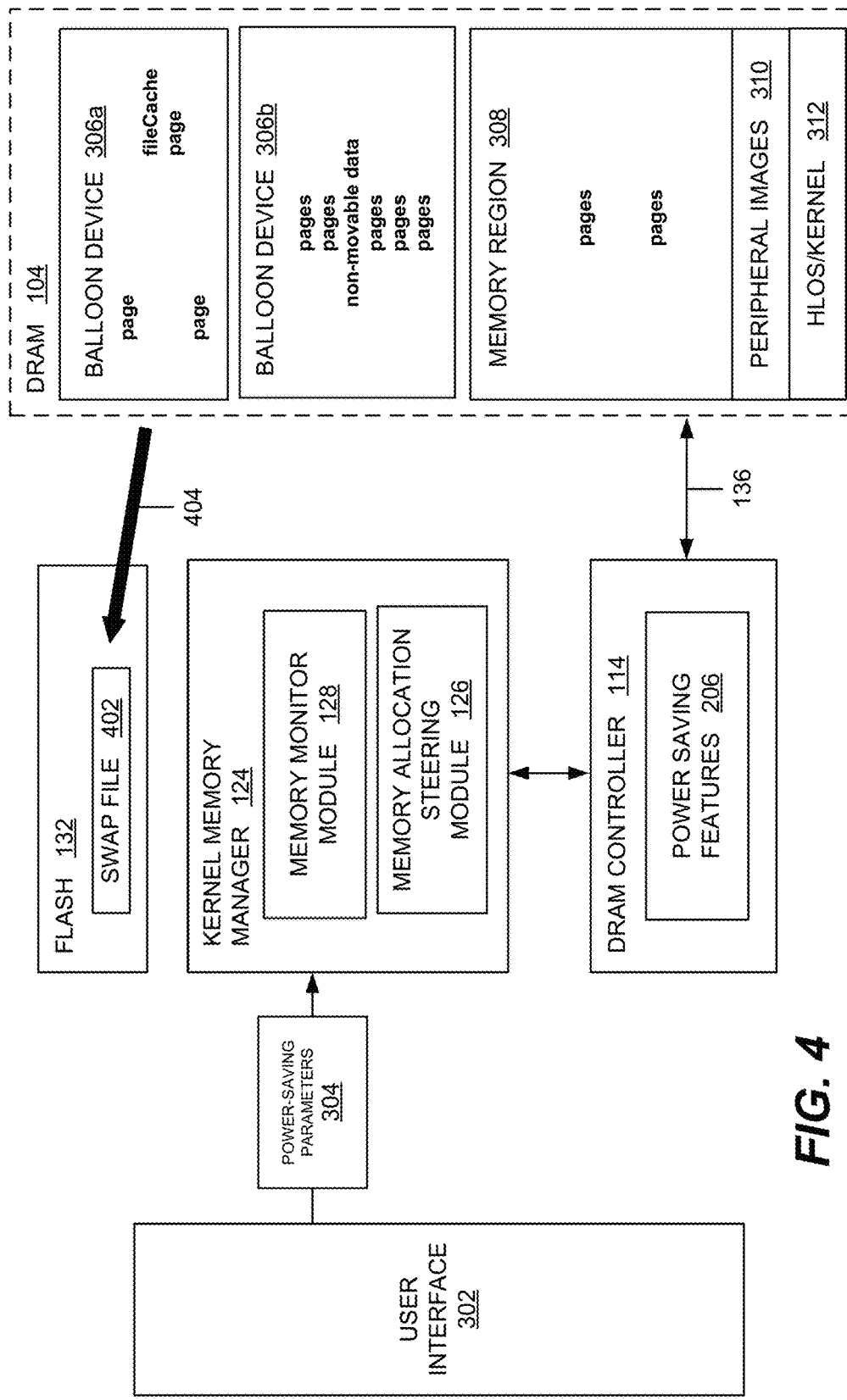
FIG. 4 illustrates migration of data in the memory balloon to a flash swap file in response to initiation of a memory power saving mode.

At block 208, the data from at least one memory balloon may be cleaned up from the DRAM 104. FIG. 4 illustrates an example in which the data from memory balloon 306a is swapped (reference numeral 404) to a swap file 402 residing in flash 132. In this regard, the kernel may check the number of active pages in the balloon, and determine whether there is an unmovable page in the balloon. Referring to FIG. 4, balloon device 306b illustrates an example where there is an unmovable page in the balloon, and the number of active pages is above, for example, a configurable maximum threshold even after termination of a user application as described in previous paragraph. Then, the kernel may decide not to power down this balloon. In the exemplary balloon device 306a, the active pages may be below the maximum threshold, and there may be no unmovable pages, in which case the kennel may decide to power down this balloon. The kernel may initiate balloon inflation by allocating empty pages into the balloon to clean up the existing pages. In order to get memory for the empty pages allocation, the kernel may invoke various mechanisms (e.g., swapping pages to flash 132, dropping file cache, killing user applications, migrating/copying pages to non-power down balloons, etc.).

At block 210, a power saving feature 305 may be executed on at least one memory balloon to provide memory power saving while in the memory power saving mode. The power saving feature 305 may comprise a partial array self refresh (PASR), a deep power down (DPD), or other power saving features supported by DRAM 104 and DRAM controller 114. It should be appreciated that a memory device may operate at various power modes. In an active power mode, the highest power state, the memory device may responds to read/write requests from the SoC 102. The DRAM controller 114 may send refresh commands to the device to refresh the DRAM cells periodically. The DRAM controller 114 may not specify the rows to be refreshed. The device may determine the next rows to be refreshed upon the refresh command from the DRAM controller 114.

Figure 5:
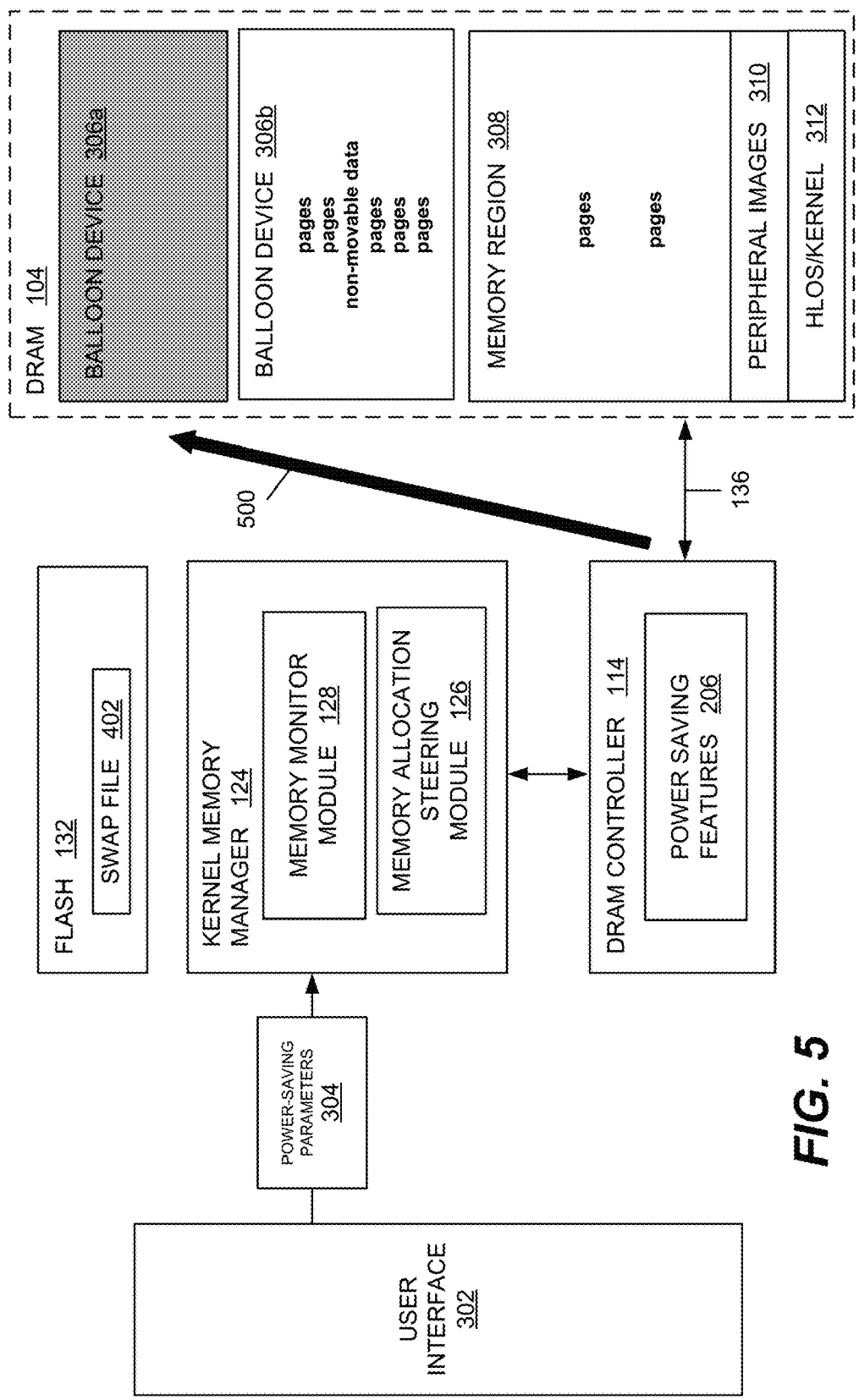
FIG. 5 illustrates the DRAM controller initiating a power saving feature on the memory balloon.

Another power mode comprise a self-refresh mode in which the device does not respond to read/write requests, and refreshes all the memory in the device to retain the data in the DRAM 104 without instruction from the SoC 102. Because there is no input/output, the DRAM controller 114 may be power collapsed, and thus reduce power. Another mode that consumes less power than self-refresh is PASR. This mode achieves more power saving on the device by not refreshing some of the memory arrays. However, the data in that memory cells will be lost. The DRAM controller 114 controls the power saving features 305 by sending mode register write command(s) to the device to specify the region to be refreshed. The device may only refresh the specified region in the self-refresh mode. It should be appreciated that there may be other ways of providing memory power saving, such as PASR, where the device responds to read/write access, but some of the memory arrays do not get refreshed, and therefore the data in that memory will be lost. The region that the SoC 102 instructs to the device for power saving mode may be controlled by a DDR driver, which in turn is notified by the HLOS kernel based on the algorithm to achieve the power saving goal. FIG. 5 illustrates an example in which the memory address range associated with memory balloon 306a is powered down via a command 500 from DRAM controller 114.

Referring again to FIG. 2, at decision block 212, an instruction may be received to exit the memory power saving mode. The instruction may be initiated via the user interface 302, based on the user-specified parameters or settings, or determined by the system 100. In response to the instruction to exit the memory power saving mode, the memory balloon(s) may be deflated to allow the physical address to be used for HLOS memory allocation (block 214). The DRAM range corresponding to the physical address of the balloon(s), which previously does not retain data during low power mode, may be instructed to retain the data at all time, and the memory power saving mode exited (block 216). The pages previously migrated to other memory regions (or swapped to flash 132) may stay as is at the current location without being moved back into the newly deflated balloon. For power saving purposes, the migrated pages may not be moved back, and the swapped pages may not be moved back immediately. Rather, the pages may only be swapped back later when the page is needed. The newly-available balloon device may be used for new memory allocation requests from the HLOS 122.

Figure 6:
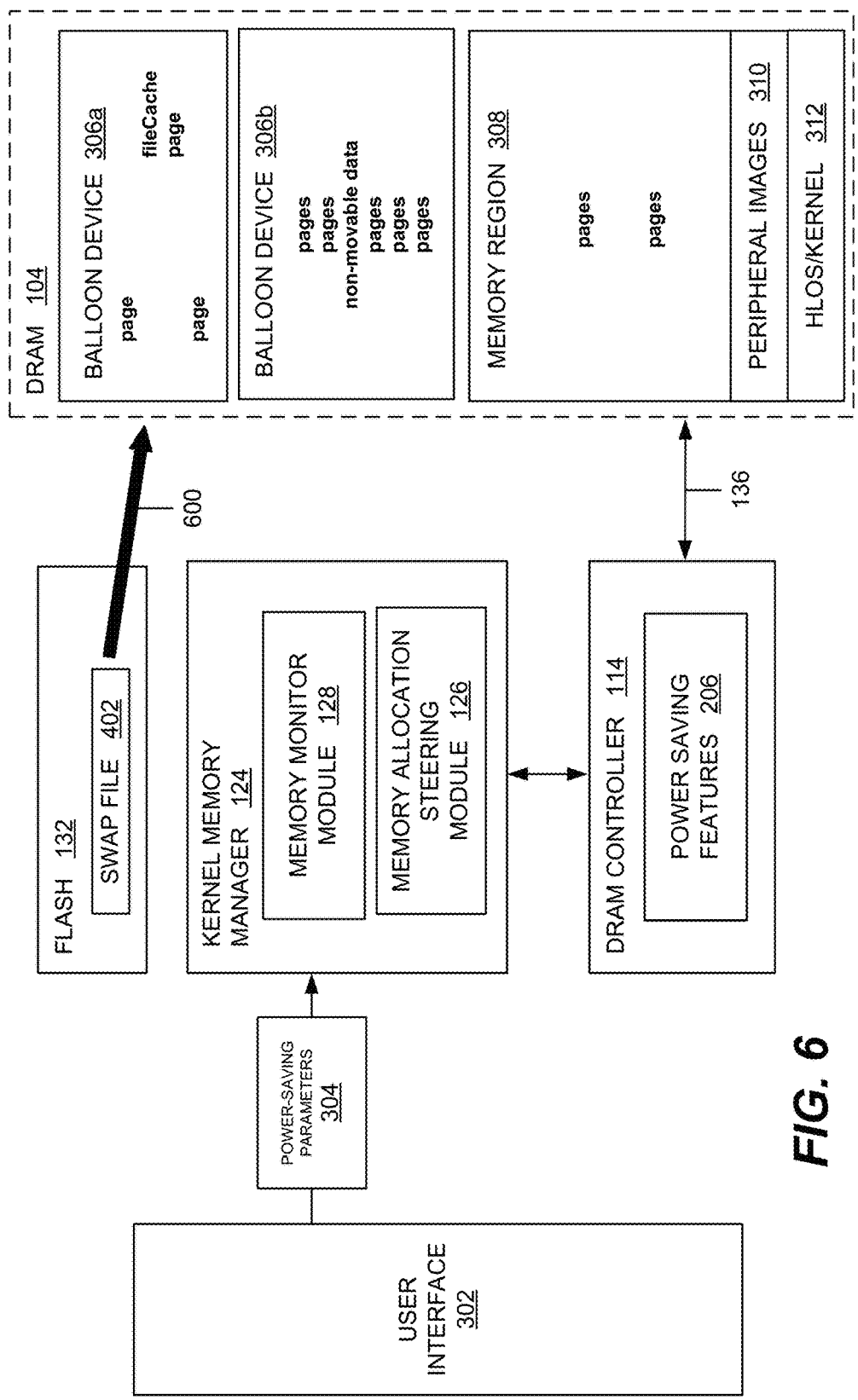
FIG. 6 illustrates restoration of the data from the flash swap file to the memory balloon.

FIG. 6 illustrates an example in which the data stored in the swap file 402 in flash 132 is swapped to memory balloon 306a (reference numeral 600). The memory device change operation mode does not mean that the system changes power saving mode. For example, during power saving mode, the balloon device may remain inflated. However, the DRAM device may be instructed to enter PASR, exit PASR to become active, and re-enter PASR, or change operation modes. Throughout the change operation mode of the DRAM device, the region corresponding to the balloon device may not be required to retain the data. In this manner, the system 100 treats the balloon device as not available.

In an exemplary embodiment, the power saving operations of the system 100 may comprise three phases: (1) a static configuration; (2) a boot time initialization; and (3) runtime. As illustrated in the exemplary data table 810 of FIG. 8a, the static configuration phase may comprise offline configuration parameters and user configuration parameters. The offline configuration parameters may be saved in the flash 132 as part of the software build and will not be changed unless there is build update. The user configuration parameters may be saved in the storage, and only changed when a static setting is changed by a user. Referring to the example of FIG. 8a, the data table 810 comprises a plurality of configurable items or configuration parameters. Parameter 811 may be used to configure the size of DRAM 104 to be enabled upon system power up. The size may be less than the whole available DRAM that is available in the system, or it can make all the DRAM available. It should be appreciated that the configurable items in table 810 may comprise a superset of the power saving parameters 304 (FIG. 3). As further illustrated in FIG. 8a and described in more detail below, the configurable items may comprise any of the additional parameters 811-827.

Figure 8:
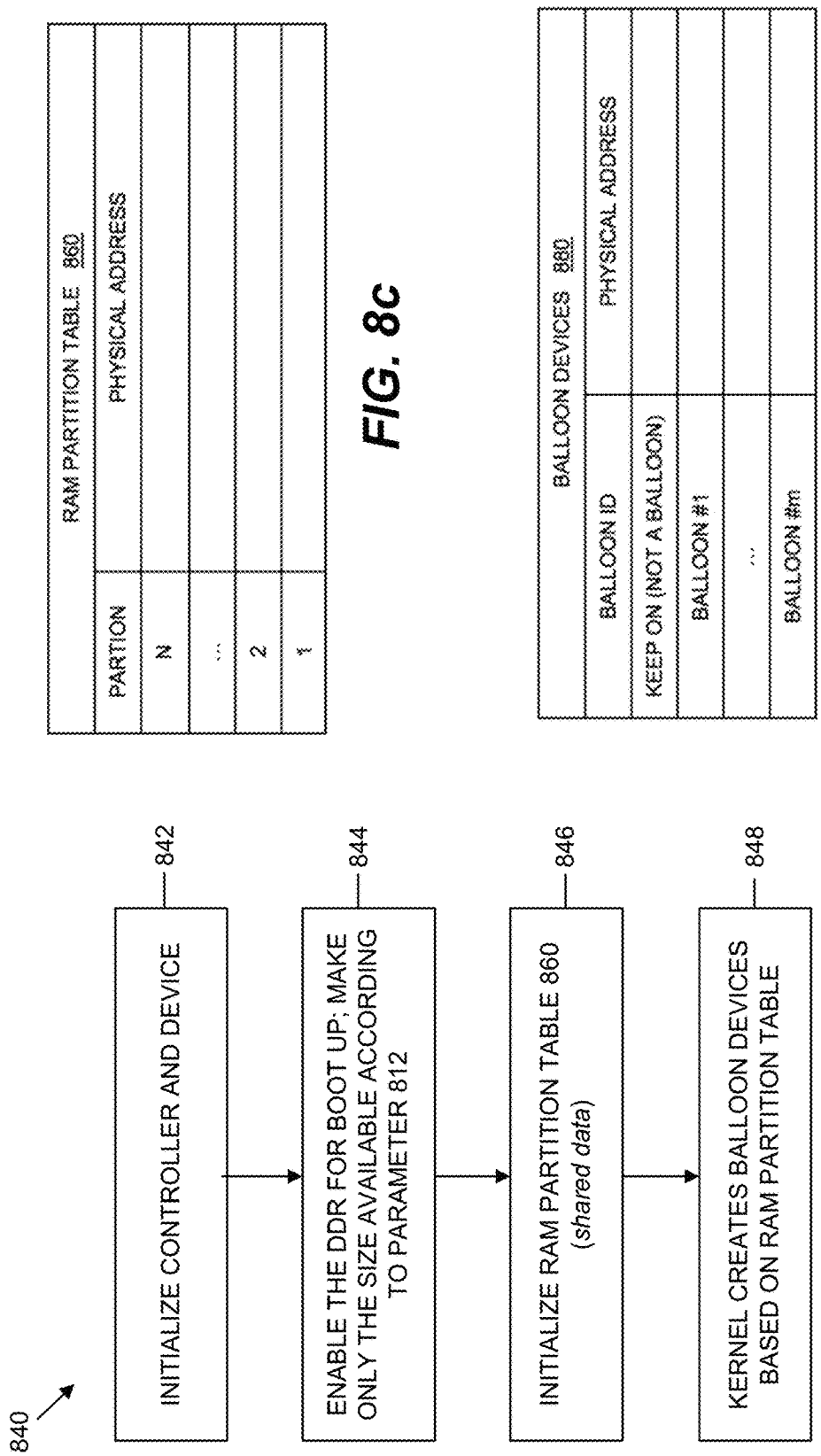
FIG. 8a is a data structure illustrating various examples of configuration parameters that may be implemented by the system of FIG. 1.
FIG. 8b is a data structure illustrating an embodiment of a boot time initialization method implemented in the system of FIG. 1.
FIG. 8c is a data structure illustrating an embodiment of a RAM partition table format used during the boot time initialization method.
FIG. 8d is a data structure illustrating an embodiment of a balloon devices list.

FIG. 8b illustrates an exemplary method 840 for the boot time initialization phase. At step 842, the system 100 initializes the platform, including, for example, the DRAM controller 114 and the DRAM 104. The DDR device configuration may be discovered (e.g., the number of ranks, how the memory device row(s), bank(s), column(s) map to the software view of the physical address, device feature(s) support, etc.). At step 844, the system 100 may enable only a portion of the available DRAM available, if the configuration parameter 811 indicates as such. At step 846, the boot stage software may pass the information to HLOS 122 for runtime usage. FIG. 8c illustrates an exemplary RAM partition table format 860, which generally provides a mapping between physical address and DDR configuration. Referring again to FIG. 8b, at step 848, the HLOS 122 may receive the information from the RAM partition table 860 (FIG. 8c), and create a list 880 (FIG. 8d) of balloon devices based on, for example, the DRAM device's feature support granularity for power feature operation. It should be appreciated that each address range of a memory balloon may be one which the DRAM controller 114 is capable of power saving (e.g., rank, deep power down (DPP), partial array self refresh (PASR), or other granularity if supported). Each address range maps to a balloon device. It should be further appreciated that the memory balloon device may be initialized with an initialization flag that indicates the corresponding balloon is only for movable pages, and that the identifiers of the balloon devices are in sequence with the level of memory power consumption. For example, when all the balloon devices are powered off and the system 100 needs to power on more memory, powering on balloon #1 does not consume more power than powering on balloon #2. In this manner, when parameter 815 (FIG. 8a) is configured to allow conversion of balloon devices, and the system 100 decides to convert a balloon device from only allowing movable page to also allowing non-movable pages, balloon #1 may be a preferred target for conversion.

During the runtime phase, the HLOS 122 dynamically steers memory allocation(s) toward/away from certain physical ranges, adjusts a memory goal, and increases/decreases available physical DRAM regions to meet the particular goal. Various examples of the operation and functionality of the memory monitor module 128 and the memory allocation steering module 126 will be described. It should be appreciated that the memory monitor module 128 may be configured to access various policy knob settings (e.g., configuration parameters 810 in FIG. 8a) and, in response, schedule a work item to perform various "active" actions.

Figure 9:
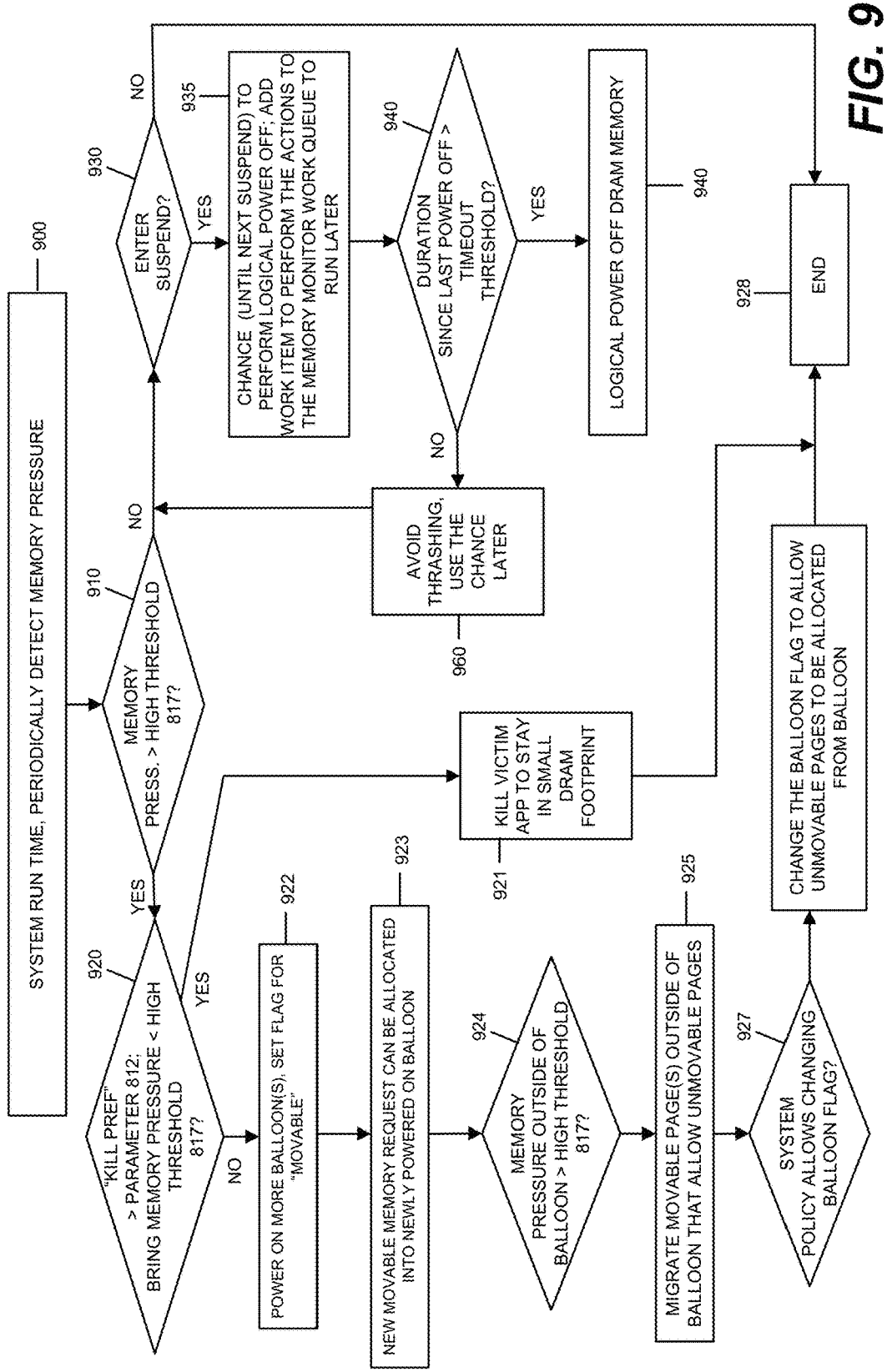
FIG. 9 is a flowchart illustrating an embodiment of a run-time method implemented in the system of FIG. 1.

Following is a description of various exemplary "active" actions, as shown in the method of FIG. 9. At step 900, during system run time, the memory monitor module 128 may wake up based on, for example, a tunable kernel parameter 814, and begin monitoring how much memory is being used on the system 100 (e.g., detect memory pressure condition(s)). At step 910, the memory monitor module 128 may check if the amount of free pages is below a threshold or the memory pressure is higher than a threshold specified in, for example, the configuration parameter 817. If the memory pressure is higher than the threshold, the system 100 may need to clean up some memory pages or power-on memory to reach this goal. At step 920, the memory monitor module 128 may check if there any user applications that may be killed to free up the memory to reach the goal. It should be appreciated that the target application(s) to be killed may have a "kill preference" higher than the configuration item 812 when user installed or configured by the application. At step 921, the memory monitor module 128 may identify victim application(s), and then proceed with the application killing process. As illustrated at step 922, the memory monitor module 128 may be unable to recover enough memory to reach the goal, and then initiate the process to power on memory.

As mentioned above, it should be appreciated that the memory monitor module 128 may select the balloon devices(s) that add the least amount of power consumption while providing enough memory for page allocation. In this regard, the balloon device(s) may be initially flagged for movable pages only. The HLOS kernel may power on the balloon devices by checking the RAM partition table 860 (FIG. 8c) to get the DRAM configuration information (e.g., rank, bank(s)) that correspond to the balloon devices to be powered on, and communicate with the power and DDR manager 116 to instruct the DRAM controller 114 to power on the DRAM partition inside DRAM 104. At step 923, with the balloon device(s) powered on, a new movable memory request may be allocated into the balloon device. If the load on the system 100, CPU usage, memory data, etc. allow, the kernel memory manager 124 may decide to proactively migrate pages (if configuration parameter 820 permits) so that the memory pressure for non-movable pages is appropriate given the amount of available physical memory. To do so, the memory monitor module 128 may check the memory pressure in the region(s) that allow for non-movable pages. This may be done by using a total size (Kbytes) of memory allocated for non-movable pages within the regions that allows for non-movable pages, and divide by the total size (Kbytes) for the regions that allow for non-movable pages. At decision-making step 924, the memory monitor module 128 calculates this non-movable memory pressure and checks whether the value is higher than, for example, the configuration item 817. If the value exceeds a threshold in configuration item 817, at step 925, the memory monitor module 128 proactively migrates movable pages out from balloon device(s) that are flagged for non-movable pages to the balloon device(s) that only accept movable pages. At step 926, the memory monitor module 128 changes if configuration parameter 815 allows conversion of balloon device type. If the parameter allows, at step 927, the kernel memory manager 124 may change the value of the flag so that unmovable pages may be allocated from the corresponding memory balloon(s). If it is necessary to allocate such pages, the kernel memory manager 124 may enforce a preference for those allocated by processes which policy allows to be killed by a shrinker chain in the memory monitor module 128. For example, the kernel memory manager 124 may avoid placing pages allocated by user processes that have a "kill preference" level lower than configured in the parameter 812, or kernel threads that should not be killed in a memory balloon, as the unmovable page may never be freed, precluding balloon inflation. When the system 100 enters the memory power saving mode, the memory monitor module 128 may be afforded an opportunity to perform a logical power off. At step 930, some examples of the events that may trigger the logical power off may comprise the system entering suspend mode, display turning off, etc. Then, the memory balloon device(s) may stay off until the memory monitor module 128 decides to make it available for allocation again. At step 935, the logical power off may be implemented by adding a work item to perform the actions to the memory monitor's work queue, which may run afterwards. At step 940, the kernel checks whether the DRAM 104 has logically powered on memory recently (e.g., via a tunable timeout threshold parameter 818). The system 100 may not attempt to logically power off memory to avoid thrashing (e.g., go back into suspend). In this case, the operation goes to step 960, where the memory monitor module 128 may be afforded the opportunity to perform the logical power off at a later time. Otherwise, the method continues to step 950 to perform logical power off.

Figure 10:
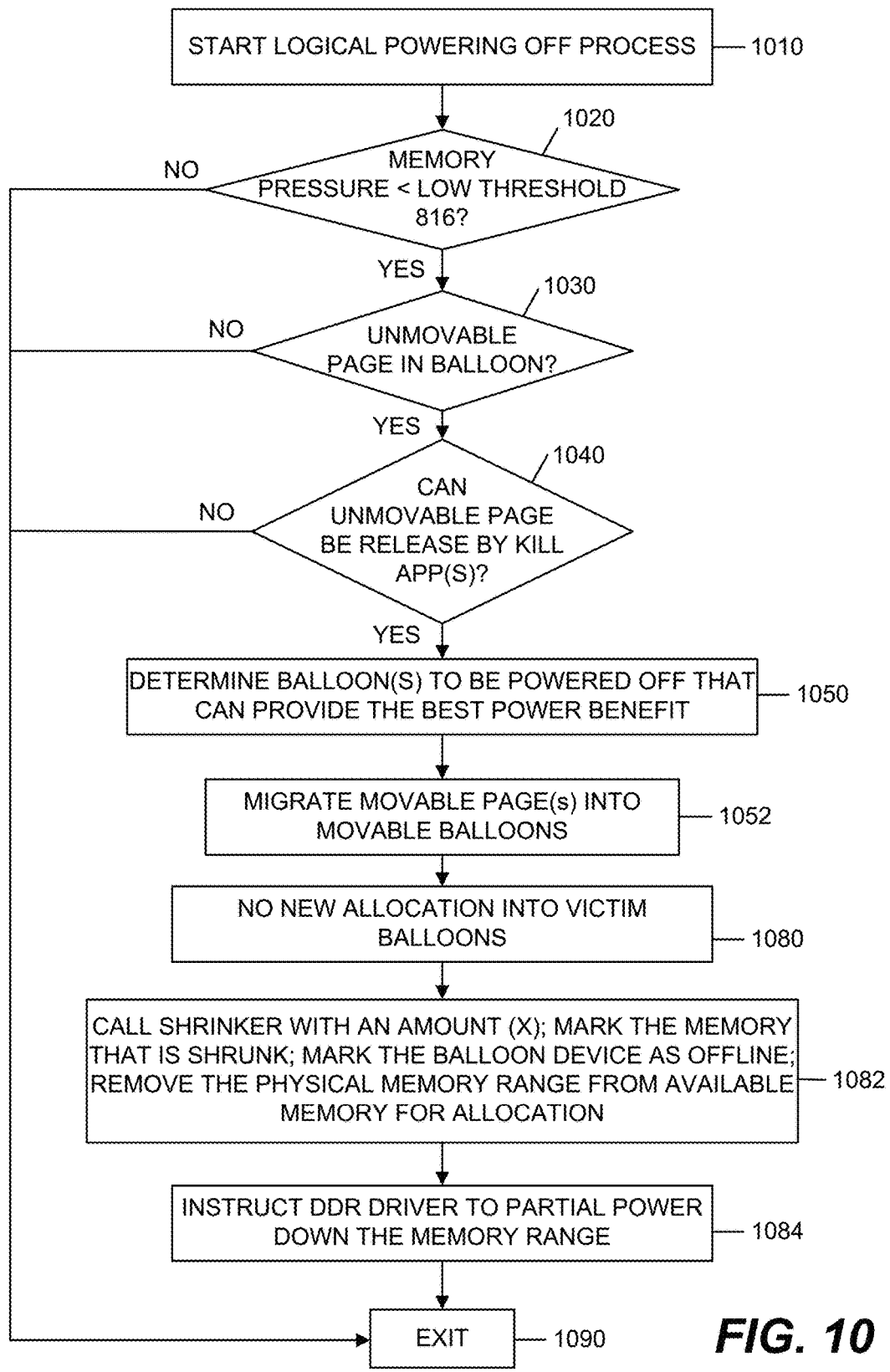
FIG. 10 is a flowchart illustrating an embodiment of the logical power off step in FIG. 9.

An embodiment for implementing step 950 is illustrated in the method of FIG. 10. At step 1010, the operation enters the process to power off. The memory monitor module 128 checks the overall memory pressure in the system. If the value is lower than the configuration parameter 816, there may be an opportunity to power off balloon device(s). The memory monitor module 128 checks the status of each powered on balloon devices, which the kernel updates every time a page(s) allocation/deallocation occurs. At step 1030, the memory monitor module 128 checks whether there are unmovable pages (which cannot be freed by killing background processes) in each memory balloons. If so, at step 1040, the memory monitor module 128 checks the configuration parameter 813 to determine whether to allow killing apps to get rid of non-movable pages. If allowed, the memory monitor module 128 checks whether the "kill preference" of the application(s) comprise a value lower than the configuration parameter 812. If the value is lower than as indicated in parameter 812, the memory monitor module 128 may kill the application to release the non-movable page(s) such that the balloon device may be powered off. Otherwise the memory monitor module 128 may not consider this balloon device as a candidate for powering off. The memory monitor module 128 may not decide to power off this balloon event if it can, according to the algorithm to be discussed next, if the goal can be reached by powering off other balloon device(s). The algorithm generally comprise estimating the effort needed for the logical powering off process and comparing it with the power saving from powering off the memory. Based on the estimation and comparison, the best option among the possible combinations may be selected.

FIG. 11 shows a data structure 1100 illustrating an exemplary method for implementing the logical powering off process. The data structure 1100 corresponds to a DRAM 104 comprising a rank 0 and a rank 1. Each rank comprises a plurality of banks 0-7. Rank 0 has a size of 4 GB allowing for 512 KB per balloon. Rank 1 has a size of 2 GB allowing for 256 KB per balloon. Row 1102 identifies a balloon identifier for each balloon in the system 100. Row 1104 identifies the status of the corresponding banks. For each bank that is on, the cells in rows 1106, 1108, 1110, and 1112 identify the size of the pages (in Kbytes) to be cleaned up from the corresponding balloon. The kernel comprises a balloon population map 1160, which comprises each of the balloon devices and the size of active pages based on the outcome of step 1040 (e.g., subtract the size of the pages for applications that can be killed and the size of file cache to be dropped without considering the balloons that have non-movable pages). In the example showed in map 1160, balloon #1 has non-movable pages and, therefore, is not to be powered off. The memory monitor module 128 checks the RAM partition table 860 (FIG. 8c) to get the DRAM topology, and maps the balloons to various options for powering off. Map 1180 illustrates various exemplary logical power off options. The mapping for PAAR (Partial Array Active Refresh) may have many possible combinations of which balloon to be powered off according to actual run time memory occupation. The memory monitor module 128 may decide to only select the balloon devices that have a size to be cleaned up smaller than indicated in the configuration parameter 819 (e.g., a MAX % of memory to shrink in a balloon for the PAAR option when the parameter is configured as 50% as shown in map 1180).

The memory monitor module 128 may estimate an effort needed to power off for this option using, for example, a formula E_shrink (1182)=size_sh (column 1181)*Overhead (824). The memory monitor module 128 may estimate the amount of memory power saving the system may get by powering off the memory. This may be done by the formula PMS (column 1183)=power saving per unit*number of units*weight, where power saving per unit is one of the items from configuration parameter 825 to 827 that matches the options. For example, a power specification from a device datasheet may be used as reference for the value of the parameter. Various weights (e.g., configuration parameters 822 and 823) may be viewed as how long a duration the system is projected to stay at low power mode during different times of the day. The memory monitor module 128 calculates the power saving margin (column 1184), where Margin=PMS−E_shrink. If none of the options has an effort that is lower than the power saving with logical power off, the system 100 may go back into suspend mode. Otherwise, the memory monitor module 128 selects the option with the highest power margin. In the example shown in map 1180, the PAAR gives the highest power saving margin.

Referring again to FIG. 10, at step 1080, "victim" balloon devices may be identified and marked according to the outcome of the algorithm selection. While a balloon device is marked as "victim", no non-contiguous allocations may be allowed. At step 1082, the memory monitor module 128 starts to inflate the victim balloon device(s). A shrinker chain may be called towards each victim balloon, with the amount of memory to be shrunk. A new specially-configured shrinker, which kills processes that own unmovable pages inside the balloon area, may run if applicable. Then, shrinkers that are allowed by the policy settings may be called in the order they normally would be. Once all the allocated pages are pushed out of the balloon device, a flag may be set to indicate that memory is being shrunk so that memory may be powered off.

For example, if the O/S 122 comprises the Android system, the Android low memory killer may behave somewhat differently from normal. It may not take free memory (in the "victim" balloon devices) into account because it may determine there is enough memory and not do anything), and only kill processes with a "kill preference" higher than a predefined or tunable value (e.g., parameter 812). If shrinking fails to recover enough memory, some or all of the "victim" balloon devices may be restored to a normal status (i.e., not to be inflated). The memory monitor module 128 may allocate the entire size of each "victim" balloon device (which will succeed since enough memory has been shrunk outside the balloon(s) to provide space for migrated pages), which may cause migration of the remaining pages of these into other memory. If multiple balloons are to be inflated, the memory monitor module 128 may ensure sure that pages are not migrated from a balloon into another "victim" balloon to prevent multiple migrations of the same page. In other embodiments, it may be possible that swapping called from the shrinker chain may have already evacuated the entire balloon device and no migration needs to be done. It should be appreciated that timestamps may be taken, as appropriate, so that the system 100 can check the timeout before performing a next memory balloon power on or power off, in order to prevent thrashing. The memory corresponding to each "victim" node is now isolated from the rest of the system and can be physically powered off.

At step 1084, the HLOS kernel may check the RAM partition table 860 to get the mapping of balloon device(s) to the DRAM structure, and communicate with the power and DDR manager 116 to instruct the DRAM controller 114 to power off the DRAM partition inside DRAM 104. The event triggering the system 100 enter power saving mode may not necessarily trigger the memory monitor module 128 to calculate the memory goal and perform logical power down every time when the entering event occurs. For example, the system 100 may briefly exit the power saving state triggered by a "display on" event, and quickly re-enter the power saving state upon a "display off" event. The memory monitor module 128 may not be executed every time upon display off, unless the duration since last logical powering on/off is greater than a timeout threshold 818, and the memory monitor module 128 has not been invoked within the timeout indicated in parameter 814. The memory allocation steering module 126 may be configured to steer upon allocation. The goal of the memory allocation steering module 126 is to steer different types of memory allocation requests towards/away from the balloon device as appropriate, to minimize the energy needed when the balloon device is inflated, and to provide memory pages to the system 100 with the possible lowest memory power consumption. The memory allocation steering module 126 cooperates with the memory monitor module 128 to achieve the memory goal of the system. When a balloon device is created, it may be flagged to be only available for movable pages. As the system 100 operates after more use cases are started, the system 100 may have a high amount of non-movable page, and the memory pressure may be increased to reach a high threshold as indicated by the configuration parameter 817. In this case, the kernel may (if the parameter 815 allows) change the value of the flag that allows unmovable pages to be allocated from the balloon(s) based on memory pressure, CPU usage, etc. If it is necessary to allocate such pages, it may be preferable for those allocated by processes which policy allows to be killed by the memory monitor shrinker chain. In particular, the system 100 may avoid placing pages allocated by critical user processes or kernel threads that are not to be killed in a balloon, as the unmovable page might never be freed, precluding inflating it. When a memory allocation request is received, the memory steering allocation module 126 checks a movability attribute of the request, steers the allocation of movable pages to the balloon for movable pages, and steers the allocation of non-movable pages to the balloon for non-movable pages, or outside of the balloon. In another embodiment, the steering may be configured to support non-unified memory allocation (NUMA) instead of balloon design, where each memory range that could be powered on/off is represented as a NUMA node instead of a balloon device.

Figure 7:
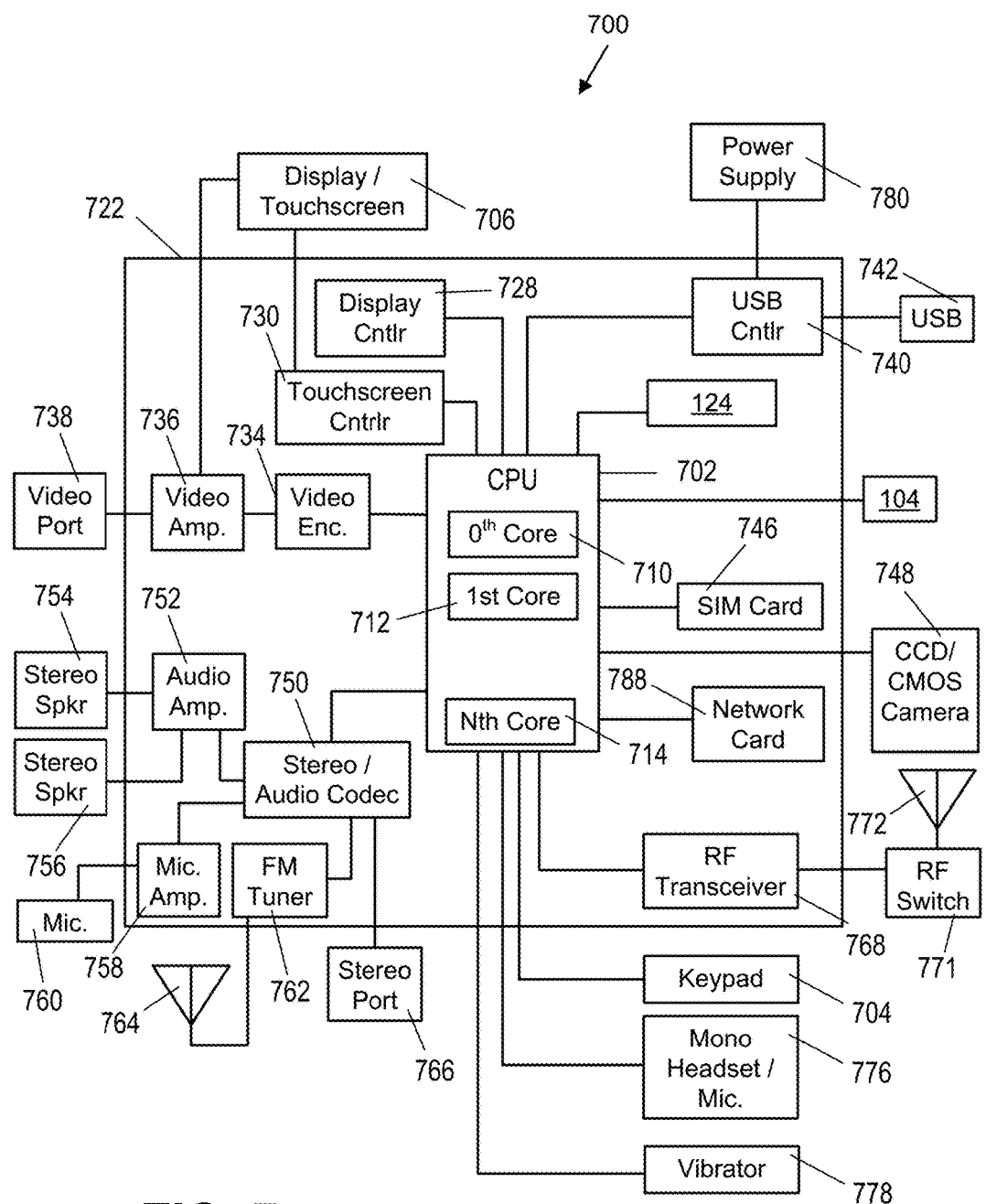
FIG. 7 is a block diagram of an exemplary embodiment of a portable computing device for incorporating the system of FIG. 1.

As mentioned above, the system 100 may be incorporated into any desirable computing system. FIG. 7 illustrates the system 100 incorporated in an exemplary portable computing device (PCD) 700. It will be readily appreciated that certain components of the system 100 may be included on the SoC 722 (e.g., DRAM controller 114, kernel memory manager 124, memory allocation steering module 126, memory monitor module 128) while other components (e.g., DRAM 104) may be external components coupled to the SoC 722. The SoC 722 may include a multicore CPU 702. The multicore CPU 702 may include a zeroth core 710, a first core 712, and an Nth core 714. One of the cores may comprise, for example, a graphics processing unit (GPU) with one or more of the others comprising the CPU 702 for supporting the O/S 122 and the kernel memory manager 124.

A display controller 728 and a touch screen controller 730 may be coupled to the CPU 702. In turn, the touch screen display 706 external to the on-chip system 722 may be coupled to the display controller 728 and the touch screen controller 730.

FIG. 7 further shows that a video encoder 734, e.g., a phase alternating line (PAL) encoder, a sequential color a memoire (SECAM) encoder, or a national television system(s) committee (NTSC) encoder, is coupled to the multicore CPU 702. Further, a video amplifier 736 is coupled to the video encoder 734 and the touch screen display 706. Also, a video port 738 is coupled to the video amplifier 736. As shown in FIG. 7, a universal serial bus (USB) controller 740 is coupled to the multicore CPU 702. Also, a USB port 742 is coupled to the USB controller 740.

Further, as shown in FIG. 7, a digital camera 748 may be coupled to the multicore CPU 702. In an exemplary aspect, the digital camera 748 is a charge-coupled device (CCD) camera or a complementary metal-oxide semiconductor (CMOS) camera.

As further illustrated in FIG. 7, a stereo audio coder-decoder (CODEC) 750 may be coupled to the multicore CPU 702. Moreover, an audio amplifier 752 may coupled to the stereo audio CODEC 750. In an exemplary aspect, a first stereo speaker 754 and a second stereo speaker 756 are coupled to the audio amplifier 752. FIG. 7 shows that a microphone amplifier 758 may be also coupled to the stereo audio CODEC 750. Additionally, a microphone 760 may be coupled to the microphone amplifier 758. In a particular aspect, a frequency modulation (FM) radio tuner 762 may be coupled to the stereo audio CODEC 750. Also, an FM antenna 764 is coupled to the FM radio tuner 862. Further, stereo headphones 866 may be coupled to the stereo audio CODEC 750.

FIG. 7 further illustrates that a radio frequency (RF) transceiver 768 may be coupled to the multicore CPU 702. An RF switch 770 may be coupled to the RF transceiver 768 and an RF antenna 772. A keypad 704 may be coupled to the multicore CPU 702. Also, a mono headset with a microphone 776 may be coupled to the multicore CPU 702. Further, a vibrator device 778 may be coupled to the multicore CPU 702.

FIG. 7 also shows that a power supply 780 may be coupled to the on-chip system 722. In a particular aspect, the power supply 780 is a direct current (DC) power supply that provides power to the various components of the PCD 700 that require power. Further, in a particular aspect, the power supply is a rechargeable DC battery or a DC power supply that is derived from an alternating current (AC) to DC transformer that is connected to an AC power source.

FIG. 7 further indicates that the PCD 700 may also include a network card 788 that may be used to access a data network, e.g., a local area network, a personal area network, or any other network. The network card 788 may be a Bluetooth network card, a WiFi network card, a personal area network (PAN) card, a personal area network ultra-low-power technology (PeANUT) network card, a television/cable/satellite tuner, or any other network card well known in the art. Further, the network card 788 may be incorporated into a chip, i.e., the network card 788 may be a full solution in a chip, and may not be a separate network card 788.

As depicted in FIG. 7, the touch screen display 706, the video port 738, the USB port 742, the camera 748, the first stereo speaker 754, the second stereo speaker 756, the microphone 760, the FM antenna 764, the stereo headphones 766, the RF switch 770, the RF antenna 772, the keypad 774, the mono headset 776, the vibrator 778, and the power supply 780 may be external to the on-chip system 722.

It should be appreciated that one or more of the method steps described herein may be stored in the memory as computer program instructions, such as the modules described above. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for reducing memory power consumption in a volatile memory, the method comprising:
    configuring a plurality of power saving memory balloons associated with the volatile memory;
    steering memory allocations to the plurality of power saving memory balloons, the memory allocations including movable pages migratable to other power saving memory balloons and non-movable pages not migratable to other power saving memory balloons;
    in response to initiating a memory power saving mode, determining which of the plurality of power saving memory balloons is preferred over others of the plurality of power saving memory balloons to execute a memory power saving feature on, wherein the determination is based at least in part on whether a power saving memory balloon is allocated one or more non-movable pages;
    cleaning up data from the preferred power saving memory balloon; and
    executing the memory power saving feature on the preferred power saving memory balloon while in the memory power saving mode.

2. The method of claim 1, wherein the volatile memory comprises a dynamic random access memory (DRAM).

3. The method of claim 1, wherein a size of the power saving memory balloon is determined by a memory monitor.

4. The method of claim 1, wherein the determination is based on, for each power saving memory balloon, whether the power saving memory balloon is allocated one or more non-movable pages and how many pages are active in the power saving memory balloon.

5. The method of claim 1, wherein the memory allocations are steered to the power saving memory balloon based on one or more user-defined parameters specified via a user interface.

6. The method of claim 1, wherein the power saving mode comprises one of a DRAM rank power down, a partial array self refresh, or partial array active refresh.

7. The method of claim 1, wherein the memory power saving mode is initiated by a user command, a user-specified condition, or a remaining battery threshold.

8. A system for reducing memory power consumption in a volatile memory, the system comprising:
means for configuring a plurality of power saving memory balloons associated with the volatile memory;
means for steering memory allocations to the plurality of power saving memory balloons the memory allocations including movable pages migratable to other power saving memory balloons and non-movable pages not migratable to other power saving memory balloons;
means for, in response to initiating a memory power saving mode, determining which of the plurality of power saving memory balloons is preferred over others of the plurality of power saving memory balloons to execute a memory power saving feature on, wherein the determination is based at least in part on whether a power saving memory balloon is allocated one or more non-movable pages;
means for migrating data from the preferred power saving memory balloon; and
means for executing the memory power saving feature on the preferred power saving memory balloon while in the memory power saving mode.

9. The system of claim 8, wherein the volatile memory comprises a dynamic random access memory (DRAM).

10. The system of claim 8, wherein a size of the power saving memory balloon is determined by a means for monitoring usage.

11. The system of claim 8, wherein the determination is based on, for each power saving memory balloon, whether the power saving memory balloon is allocated one or more non-movable pages and how many pages are active in the power saving memory balloon.

12. The system of claim 8, wherein the memory allocations are steered to the power saving memory balloon based on one or more user-defined parameters specified via a user interface.

13. The system of claim 8, wherein the power saving feature comprises one of a rank power down, partial array self refresh, and partial array auto refresh.

14. The system of claim 8, wherein the memory power saving mode is initiated by a user command, a user-specified condition, or a remaining battery threshold.

15. A system for reducing memory power consumption, the system comprising:
a volatile random access memory; and
a system on chip (SoC) comprising a memory controller and a kernel memory manager, the memory controller electrically coupled to the volatile random access memory, and the kernel memory manager comprising logic configured to:
configure a plurality of power saving memory balloons associated with the volatile memory;
steer memory allocations to the plurality of power saving memory balloons, the memory allocations including movable pages migratable to other power saving memory balloons and non-movable pages not migratable to other power saving memory balloons;
in response to initiating a memory power saving mode, determine which of the plurality of power saving memory balloons is preferred over others of the plurality of power saving memory balloons to execute a memory power saving feature on, wherein the determination is based at least in part on whether a power saving memory balloon is allocated one or more non-movable pages;
migrate data from the preferred power saving memory balloon; and
execute the memory power saving feature on the preferred power saving memory balloon while in the memory power saving mode.

16. The system of claim 15, wherein the volatile memory comprises a dynamic random access memory (DRAM).

17. The system of claim 15, wherein a size of the power saving memory balloon is determined by a memory monitor.

18. The system of claim 15, wherein the determination is based on, for each power saving memory balloon, whether the power saving memory balloon is allocated one or more non-movable pages and how many pages are active in the power saving memory balloon.

19. The system of claim 15, wherein the memory allocations are steered to the power saving memory balloon based on one or more user-defined parameters specified via a user interface.

20. The system of claim 15, wherein the power saving mode comprises one of a rank power down, a partial array self refresh, or a partial array auto refresh.

21. The system of claim 15, wherein the memory power saving mode is initiated by a user command, a user-specified condition, or a remaining battery threshold.

22. The system of claim 15 incorporated in a portable computing device.

23. The system of claim 15, wherein the portable computing device comprises one of a tablet computer, a smart phone, and a wearable computing device.

24. A computer program embodied in a non-transitory computer readable medium and executed by a processor for reducing memory power consumption in a volatile memory, the computer program comprising logic configured to:
configure a plurality of power saving memory balloons associated with the volatile memory;
steer memory allocations to the plurality of power saving memory balloons, the memory allocations including movable pages migratable to other power saving memory balloons and non-movable pages not migratable to other power saving memory balloons;
in response to initiating a memory power saving mode, determine which of the plurality of power saving memory balloons is preferred over others of the plurality of power saving memory balloons to execute a memory power saving feature on, wherein the determination is based at least in part on whether a power saving memory balloon is allocated one or more non-movable pages;

migrate data from the preferred power saving memory balloon; and execute the memory power saving feature on the preferred power saving memory balloon while in the memory power saving mode.

25. The computer program of claim 24, wherein the volatile memory comprises a dynamic random access memory (DRAM).

26. The computer program of claim 24, wherein a size of the power saving memory balloon is determined by a memory monitor.

27. The computer program of claim 24, wherein the determination is based on, for each power saving memory balloon, whether the power saving memory balloon is allocated one or more non-movable pages and how many pages are active in the power saving memory balloon.

28. The computer program of claim 24, wherein the memory allocations are steered to the power saving memory balloon based on one or more user-defined parameters specified via a user interface.

29. The computer program of claim 24, wherein the power saving feature comprises one of a rank power down, a partial array self refresh, and a partial array auto refresh.

30. The computer program of claim 24, wherein the memory power saving mode is initiated by a user command, a user-specified condition, or a remaining battery threshold.

* * * * *